United States Patent Office 3,076,992
Patented Feb. 12, 1963

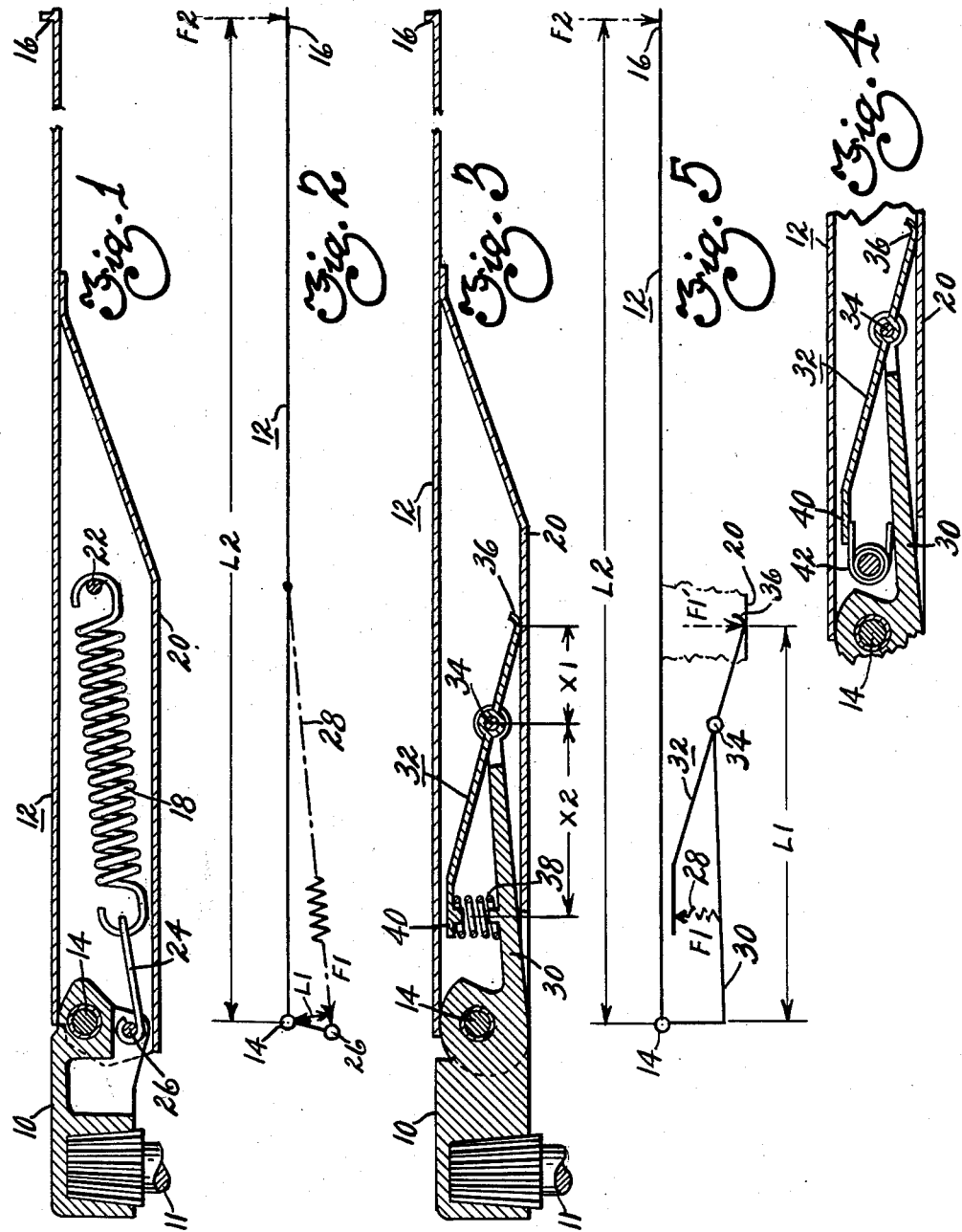

3,076,992
WINDSHIELD WIPER ARM
Elmer E. Reese, Rochester, N.Y., assignor to General Motors Corporation, Detroit, Mich., a corporation of Delaware
Filed Aug. 28, 1961, Ser. No. 134,347
8 Claims. (Cl. 15—250.35)

This invention pertains to windshield wiper arms, and particularly to an improved spring arrangement for applying pressure to the blade carrying arm section to hold the wiper blade in contact with the glass surface to be cleaned.

Conventional windshield wiper arms comprise an inner, or mounting, section adapted for connection to a pivot shaft, and an outer blade carrying section pivotally connected thereto by a transversely extending pin. The two arm sections normally have an extension spring disposed lengthwise of the arm, the two ends of the extension spring being anchored to supports on the inner and outer arm sections for biasing the outer arm section about its pivotal connection with the inner section and thus hold a wiper blade carried by the outer section in engagement with the windshield surface. By reason of the fact that the inner arm section is relatively small, the distance between the axis of the pivotal connection between the inner and outer sections and the line of the spring force, or the effective lever arm through which the spring acts, is relatively short. Thus, in order to obtain the requisite force at the tip of the outer arm section to which the blade is attached, the extension spring must be made of large diameter wire having a high spring rate and a high spring force.

The present invention relates to a spring arrangement for a windshield wiper arm wherein the requisite force can be obtained at the tip end of the outer arm section by using a spring of small diameter which has a low spring rate and a low spring force. In this manner, the high loads imposed on the pin pivotally interconnecting the inner and outer arm sections are reduced considerably, thus reducing the wear on the several parts which often results in failure of the wiper arm at the pivot connection between the two sections. Accordingly, among my objects are the provision of a windshield wiper arm having pivotally interconnected inner and outer sections and embodying spring means having a low spring rate and low spring force for obtaining the requisite pressure at the tip end of the outer arm section; the further provision of a windshield wiper arm including a force multiplying lever between the pressure applying spring and the outer arm section; and the still further provision of a wiper arm including a pivotally mounted pressure lever carried by the inner arm section and disposed within the outer arm section for applying pressure thereto at a point located a substantial distance outwardly from the pivotal connections between the inner and outer arm sections.

The aforementioned and other objects are accomplished in the present invention by pivotally supporting a pressure lever within the outer arm section on a radial extension of the inner arm section and utilizing the mechanical advantage of the pressure lever to further reduce the spring force required to produce the requisite pressure at the tip end of the outer arm section. Specifically, the operating end of the pressure lever which engages the outer arm section is disposed a substantial distance outward from the axis of the pivotal connection between the inner and outer sections. In this manner, the effective lever arm, that is the distance between the operating end of the pressure lever and the axis of the pivotal connection between the inner and outer arm sections, can be increased to a length between one-fourth and one-third of the length of the outer arm section. Since in conventional windshield wiper arms the effective lever arm of the extension spring may only be on the order of one forty-eighth of the length of the outer arm section, it is readily apparent that the force required at the operating end of the pressure lever in a wiper arm constructed according to the present invention will be substantially less than the spring force required of an extension spring in a conventional wiper arm. In addition, the pressure lever may be pivoted off center to increase the mechanical advantage of the spring so that the effective spring force at the operating end of the pressure lever is multiplied relative to the force applied by the spring at the opposite end thereof.

Two embodiments of the improved spring arrangement for wiper arms are disclosed herein utilizing a force multiplying pressure lever. In the first embodiment, a coil-type compression spring acts between the extension on the inner arm section and the inner end of the pressure lever. In the second embodiment a torsion spring acts between the inner arm extension and the inner end of the pressure lever.

Further objects and advantages of the present invention will be apparent from the following description, reference being had to the accompanying drawing, wherein preferred embodiments of the present invention are clearly shown, and wherein similar numerals depict similar parts throughout the several views.

In the drawing:

FIGURE 1 is a fragmentary, longitudinal, sectional view of a wiper arm having a prior art conventional extension spring.

FIGURE 2 is a view illustrating diagrammatically the force and effective lever arm arrangement in a conventional prior art wiper arm.

FIGURE 3 is a fragmentary, sectional view of one embodiment of a wiper arm constructed according to the present invention.

FIGURE 4 is a fragmentary, sectional view of a wiper arm constructed according to a second embodiment of the present invention.

FIGURE 5 is a view illustrating diagrammatically the force and effective lever arm arrangement of wiper arms constructed according to the present invention.

With particular reference to FIGURE 1, a conventional wiper arm is shown comprising an inner, or mounting, section 10 adapted to be drivingly connected to a pivot shaft 11, and having an outer, or blade carrying, section 12 pivotally connected thereto by a transversely extending pin 14. The outer section 12 is adapted to carry a wiper blade, not shown, which is detachably connected thereto at the tip end 16 thereof. A coil-type extension spring 18 is enclosed by the outer arm section 12 which includes a lower cover portion 20, one end of the spring being connected to a support 22 secured to the outer arm section 12 and the other end of the spring 18 being connected to a hook 24 mounted on a transverse pin 26 carried by the inner arm section 10. The length of the outer arm section 12, that is, the distance from the axis of the pin 14 to the tip end 16 may be in excess of twelve inches.

Referring to FIGURE 2, the effective lever arm of the extension spring 18 is the perpendicular distance L1 between the axis of the pin 14 and the line of spring force F1 indicated by broken line 28. In this prior art construction the line of spring force extends lengthwise of the arm and transversely of the axis of pivot pin 14. In an actual windshield wiper arm, the effective lever arm length, L1, is on the order of three-eighths inch. Moreover, with sixteen and eighteen inch wiper blades being used on numerous vehicles, the force F2 at the tip end of the outer arm section must be on the order of eighteen ounces, or 1.12 pounds. Obviously, in order to obtain this force F2 at the tip end of the outer arm section through the effective lever arm length L2, namely the distance between the axis of the pin 14 and the tip end 16 of the wiper arm, the force of the extension spring, namely F1, must be substantial since the product of F1 and L1 equals the product of F2 and L2. In a typical wiper arm the force exerted by the tension spring must be on the order of fifty pounds to obtain a force of eighteen ounces at the tip end of the outer arm section.

With reference to FIGURE 3, in the first embodiment of a wiper arm constructed according to this invention, the inner arm section 10 is likewise connected by a transverse pin 14 to the outer arm section 12. However, the inner arm section 10 is formed with an integral extension 30 having its end disposed within the outer arm section 12 and located a substantial distance from the hinge pin 14. A pressure lever 32 extending lengthwise of the arm is supported on a pin 34 carried by the outer end of the extension 30, the outer end 36 of the lever 32 engaging the cover 20 attached to a channel-type outer arm section. The outer arm section may also be tubular in which case the cover 20 would be formed by the integral bottom wall thereof. A coil-type compression spring 38 is arranged between the inner end 40 of the lever 32 and the extension 30. In order to multiply the force applied at the end 36 to the outer arm section 12, the lever 32 is pivoted off center such that the distance X1 between the pivot 34 and the end 36 is half, or less than half the distance X2 between the pivot 34 and the axis of the spring 38. In the modified embodiment depicted in FIGURE 4, a torsion spring 42 is substituted for the coil-type compression spring 38 in the embodiment of FIGURE 3. However, the force multiplying arrangement of the pressure lever 32 is the same in both embodiments.

With reference to FIGURE 5, the effective spring force F1' which acts in a direction normal to the length, or longitudinal axis, of the wiper arm operates on the wiper arm through an effective lever arm L1, namely the perpendicular distance between the line of force 28 and the axis of the pivot 14. Since the length of the outer arm section from the axis of the pivot 14 to the tip end 16, namely L2, is the same in FIGURES 2 and 5, and the force F2 at the tip end of the wiper arm is likewise the same in FIGURES 2 and 5, it is readily apparent that since the effective lever arm L1 in FIGURE 5 is several times longer than the effective lever arm L1 in FIGURE 2, to obtain the same force F2 with the geometry of FIGURE 5, the magnitude of the force F1' need only be a fraction of the magnitude of the force F1' with the geometry of FIGURE 2. Since the product of F1' and L1 equals the product of F2 and L2, it follows that the ratio of the forces, F1' and F2, is equal to the inverse ratio of the lengths, namely L2 to L1. Thus, if the ratio of the lengths L2 to L1 is between 3:1 and 4:1, which arrangement is feasible with a wiper arm constructed according to the present invention, it will be appreciated that the force F1 of either the compression spring 38 or the torsion spring 42 need only be between one and one-half and twice the force F2 due to the force multiplication effected by the lever 32. If the lever 32 effects a force multiplication of two to one, a two pound spring acting between the extension 30 and the end 40 of the pressure lever 32 will exert a four pound force at the point 36, and assuming the length of the wiper arm from the axis of the pivot 14 to the tip 16 to be twelve inches, in order to exert a force of 1.12 pounds at the tip end 16 the distance L1, that is between the axis of pivot 14 and the point 36 must be approximately 3.37 inches.

It is readily apparent that by constructing wiper arms with the spring arrangement of the present invention the load on the pivot between the inner and outer sections can be reduced to less than one-twelfth that of conventional wiper arms, consequently reducing wear on the several parts. In this manner failure of the pivot joint between the two arm sections will be substantially eliminated.

While the embodiments of the invention as herein disclosed constitute preferred forms, it is to be understood that other forms might be adopted.

What is claimed is as follows:

1. A wiper arm comprising, an inner section, an outer section pivotally connected with said inner section, a pressure lever pivotally connected to said inner section on an axis parallel to the pivotal connection between the inner and outer sections and located a substantial distance outwardly therefrom, the outer end of said pressure lever engaging said outer arm section, and a spring reacting between said inner arm section and the inner end of said pressure lever, the line of spring force between said pressure lever and said outer arm section extending normal to said outer arm section.

2. A wiper arm comprising, a mounting section, a blade carrying section pivotally connected to said mounting section for movement toward and from an associated windshield, said mounting section having an extension disposed within said blade carrying section and terminating a substantial distance outwardly from the pivot axis, a force multiplying pressure lever pivotally connected to the outer end of said extension on an axis parallel to the pivot axis between said mounting section and said blade carrying section, the outer end of said force multiplying pressure lever engaging the outer arm section outwardly from the pivot axis between said lever and said extension, and spring means reacting between said extension and the inner end of said force multiplying pressure lever and producing an effective line of spring force at the lower end of said lever extending normal to the blade carrying arm section.

3. The wiper arm set forth in claim 2 wherein said spring means comprises a coil-type compression spring.

4. The wiper arm set forth in claim 2 wherein said spring means comprises a torsion spring.

5. A spring assembly for a wiper arm having pivotally connected inner and outer arm sections, comprising, a pressure lever extending lengthwise of said arm and having an intermediate pivotal connection to said inner arm section on an axis parallel to the pivot axis between said arm sections, and a spring reacting between the inner end of said lever and said inner arm section, the outer end of said lever engaging said outer arm section a substantial distance outwardly from the pivot axis between said arm sections to produce an effective line of spring force extending normal to the longitudinal axis of said arm.

6. The spring assembly set forth in claim 5 wherein the pivotal connection between the inner arm section and said pressure lever is located closer to the outer end of said pressure lever than to the inner end thereof whereby the effective spring force applied to the outer arm section is a multiple of the actual force of said spring.

7. A windshield wiper arm including, a mounting section, a blade carrying section pivotally connected to said mounting section, a pressure lever pivotally connected to said mounting section on a axis transverse to the longitudinal axis of said windshield wiper arm and located a substantial distance outwardly from the pivotal connection between said mounting section and said blade carrying section, the outer end of said pressure lever engaging said blade carrying section, a spring reacting between the mounting section and the inner end of said pressure lever, the line of spring force between said pressure lever and said blade carrying section extending normal to said blade carrying section.

8. A spring assembly for a windshield wiper arm having pivotally connected inner and outer arm sections, including, a pressure lever extending lengthwise of the arm and having an intermediate pivotal connection to said inner arm section on an axis transverse to the longitudinal axis of said windshield wiper arm, and spring means reacting between the inner end of said lever and said inner arm section, the outer end of said lever engaging the outer arm section a substantial distance outwardly from the pivotal connection between said arm sections to produce an effective line of spring force extending normal to the longitudinal axis of said windshield wiper arm.

References Cited in the file of this patent

UNITED STATES PATENTS 2,528,258    Zaiger ---------------- Oct. 31, 1950

FOREIGN PATENTS 827,427    Great Britain ----------- Feb. 3, 1960
856,157    Great Britain ---------- Dec. 14, 1960